US012614449B2

(12) United States Patent
Sakagawa et al.

(10) Patent No.: US 12,614,449 B2
(45) Date of Patent: Apr. 28, 2026

(54) SYSTEM, METHOD, AND COMPUTER READABLE STORAGE MEDIUM

(71) Applicant: HONDA MOTOR CO.,LTD., Tokyo (JP)

(72) Inventors: Yuta Sakagawa, Saitama (JP); Shigeru Inoue, Saitama (JP); Takahiro Kurehashi, Saitama (JP); Moriya Horiuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 317 days.

(21) Appl. No.: 18/452,582

(22) Filed: Aug. 21, 2023

(65) Prior Publication Data

US 2024/0078899 A1    Mar. 7, 2024

(30) Foreign Application Priority Data

Sep. 7, 2022    (JP) ................................. 2022-142545

(51) Int. Cl.
*G08G 1/01* (2006.01)
*G08G 1/0967* (2006.01)
(Continued)

(52) U.S. Cl.
CPC .......... *G08G 1/012* (2013.01); *G08G 1/0116* (2013.01); *G08G 1/096708* (2013.01);
(Continued)

(58) Field of Classification Search
CPC ................ G08G 1/012; G08G 1/0116; G08G 1/096708; G08G 1/164; G08G 1/166; H04W 4/44
See application file for complete search history.

(56) References Cited

U.S. PATENT DOCUMENTS

| | | | |
|---|---|---|---|
| 6,597,906 B1 * | 7/2003 | Van Leeuwen | ..... H04W 64/006 455/436 |
| 8,451,929 B2 * | 5/2013 | Agee | ........................ H04B 7/10 375/267 |

(Continued)

FOREIGN PATENT DOCUMENTS

| | | |
|---|---|---|
| JP | 2005032010 A | 2/2005 |
| JP | 2021093162 A | 6/2021 |

OTHER PUBLICATIONS

Office Action issued for counterpart Japanese Application No. 2022-142545, transmitted from the Japanese Patent Office on Jul. 15, 2025 (drafted on Jul. 8, 2025).

*Primary Examiner* — Peter D Nolan
*Assistant Examiner* — Wae L Louie

(57)    ABSTRACT

A system for providing information to equipment which is movable, the system includes a first reception section which receives position information of the equipment from the equipment, a first transmission section which transmits, based on the position information of the equipment, assistance information related to a movement of the equipment to the equipment through a base station of a mobile communication, a predicting section which predicts, based on the position information of the equipment, equipment entering a communication available area of a mobile object having a function of communicating with the equipment, and a second transmission section which transmits, to the mobile object, information related to the equipment predicted to enter the communication available area by the predicting section.

18 Claims, 5 Drawing Sheets

(51) Int. Cl.
   G08G 1/16 (2006.01)
   H04W 4/44 (2018.01)

(52) U.S. Cl.
   CPC ............. G08G 1/164 (2013.01); G08G 1/166
   (2013.01); H04W 4/44 (2018.02)

(56) References Cited

U.S. PATENT DOCUMENTS

| | | | | |
|---|---|---|---|---|
| 8,666,416 | B2* | 3/2014 | Mori ................... | H04W 36/302 |
| | | | | 455/445 |
| 2004/0198395 | A1* | 10/2004 | Kimoto ................... | H04W 4/02 |
| | | | | 455/456.3 |
| 2012/0056781 | A1* | 3/2012 | Kong ................... | G01S 19/252 |
| | | | | 342/357.42 |
| 2013/0344842 | A1* | 12/2013 | McDonald ............. | H04W 4/90 |
| | | | | 455/404.2 |
| 2015/0072696 | A1* | 3/2015 | Nakata ................. | H04W 72/51 |
| | | | | 455/450 |
| 2017/0273039 | A1* | 9/2017 | Adachi .............. | H04W 56/001 |
| 2018/0049274 | A1* | 2/2018 | Kim ................... | H04W 84/005 |
| 2019/0253948 | A1* | 8/2019 | Nagura ............ | H04W 36/0088 |
| 2021/0171027 | A1* | 6/2021 | Kang ................... | H04N 5/265 |

* cited by examiner

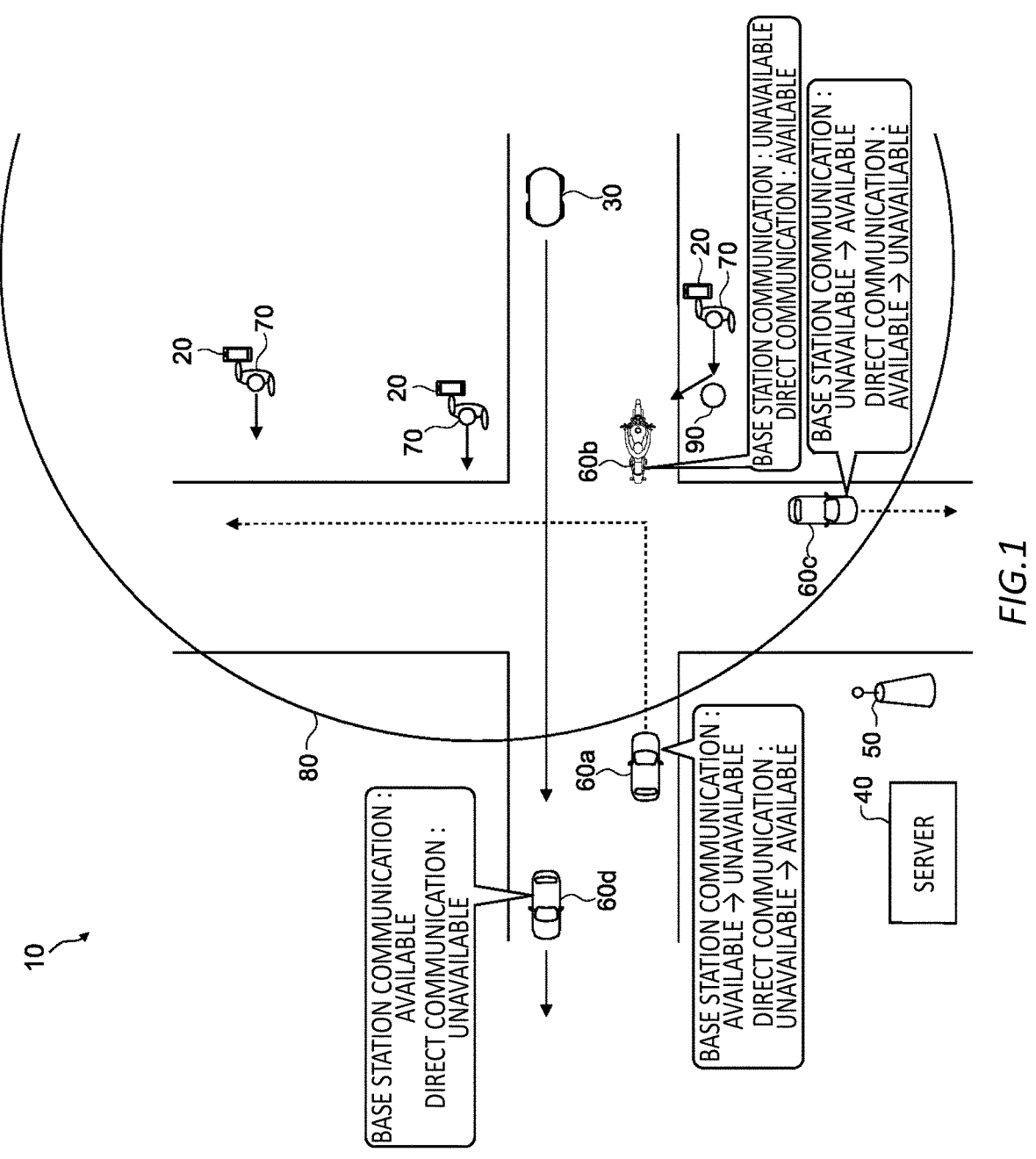

BASE STATION COMMUNICATION : UNAVAILABLE
DIRECT COMMUNICATION : AVAILABLE

BASE STATION COMMUNICATION :
UNAVAILABLE → AVAILABLE
DIRECT COMMUNICATION :
AVAILABLE → UNAVAILABLE

BASE STATION COMMUNICATION :
AVAILABLE → UNAVAILABLE
DIRECT COMMUNICATION :
UNAVAILABLE → AVAILABLE

BASE STATION COMMUNICATION :
AVAILABLE
DIRECT COMMUNICATION :
UNAVAILABLE

SERVER

FIG.1

SYSTEM, METHOD, AND COMPUTER READABLE STORAGE MEDIUM

The contents of the following Japanese patent application (s) are incorporated herein by reference:
NO. 2022-142545 filed in JP on Sep. 7, 2022.

TECHNICAL FIELD

The present invention relates to a system, a method, and a computer readable storage medium.

BACKGROUND

Patent Document 1 describes that, once a particular traveling situation is sensed during traveling of a vehicle, ADAS data, position data, travel data, and a traveling video in connection to the sensed particular traveling situation are transmitted to a service providing server. In recent years, efforts have been intensified to provide access to a sustainable transportation system with consideration given to even vulnerable people among other traffic participants. To realize this, research and development has been focused on to further improve traffic safety and convenience through research and development regarding a preventive safety technique.

PRIOR ART DOCUMENT

Patent Document 1: Japanese Patent Application Publication No. 2021-093162

BRIEF DESCRIPTION OF THE DRAWINGS

FIG. 1 shows an overall configuration of a system 10 according to an embodiment.

DESCRIPTION OF EXEMPLARY EMBODIMENTS

Figure 2:
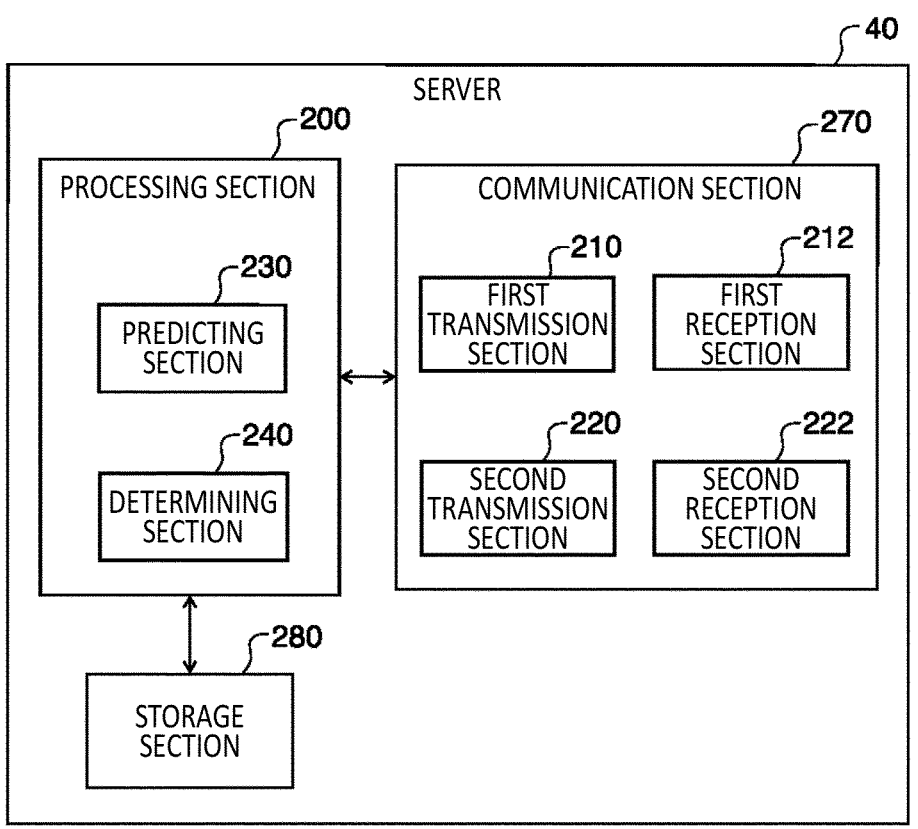
FIG. 2 illustrates a functional configuration of a server 40.

Hereinafter, embodiments of the present invention will be described, but the embodiments do not limit the invention according to the claims. In addition, not all of the combinations of features described in the embodiments are essential to the solution of the invention.

FIG. 1 shows an overall configuration of a system 10 according to an embodiment. The system 10 is a system for providing information to traffic participants.

The system 10 includes a server 40, a base station 50, a mobile object 30, a vehicle 60a, a vehicle 60b, a vehicle 60c, and a vehicle 60d. In the present embodiment, the vehicle 60a, the vehicle 60b, the vehicle 60c, and the vehicle 60d may be collectively referred to as the "vehicle 60". The vehicle is an example of transportation equipment, and it may be an automobile, a motorcycle, a bicycle, or the like.

The base station 50 is a base station for a mobile object communication. The server 40 is a server that is communicably connected to the base station 50. The server 40 may include an edge computing server such as a mobile edge computing (MEC) server, for example.

A mobile communication terminal 20 is a terminal carried by a person 70, for example. The mobile communication terminal 20 is a portable terminal such as a smartphone, for example. The mobile communication terminal 20 has a function of performing the mobile object communication through the base station 50. The mobile communication terminal 20 communicates with the server 40 by the mobile object communication through the base station 50 that is nearby. The server 40 continuously receives position information detected with each mobile communication terminal 20.

The vehicle 60 has a function of performing the mobile object communication through the base station 50. The vehicle 60 communicates with the server 40 by the mobile object communication through the base station 50 that is nearby. The server 40 continuously receives position information detected with each vehicle 60 and information detected with various sensors included in the vehicle 60. The vehicle 60 and the mobile communication terminal 20 are examples of "equipment which is movable". The vehicle 60 and the mobile communication terminal 20 are examples of traffic participants.

The server 40 holds information received from each of the vehicle 60 and the mobile communication terminal 20. The server 40 determines a traffic risk based on the information received from each of the vehicle 60 and the mobile communication terminal 20, and provides information related to the traffic risk to the vehicle 60. For example, when the mobile communication terminal 20 is moving toward a future position in an advancing direction of the vehicle 60, the server 40 informs the vehicle 60 of a traffic risk via the base station 50.

The vehicle 60 and the mobile communication terminal 20 have a function of performing a direct communication with the mobile object 30 in addition to the mobile object communication function. The mobile object 30 has a function of performing a direct communication with the vehicle 60 and the mobile communication terminal 20 in addition to the function of performing the mobile object communication through the base station 50. Cellular V2X (C-V2X), Wi-Fi (registered trademark), or the like can be exemplified as a communication method of the direct communication between the vehicle 60 and the mobile communication terminal 20, and the mobile object 30.

The mobile object 30 may be a self-driving vehicle that travels by self-driving, for example. The mobile object 30 may be a passenger transport vehicle such as a taxi or a bus, a package transport vehicle that transports a package, or the like, for example.

The mobile object 30 receives position information of the vehicle 60 and the mobile communication terminal 20 by the direct communication with the vehicle 60 and the mobile communication terminal 20. When the vehicle 60 is predicted to approach the person 70 based on the position information of the vehicle 60 and the position information of the mobile communication terminal 20, the mobile object 30 informs the vehicle 60 and/or the mobile communication terminal 20 of the presence of a traffic risk by the direct communication.

The server 40 receives a route scheduled to be traveled by the mobile object 30 from the mobile object 30. The server 40 receives position information of the mobile object 30 from the mobile object 30. The server 40 specifies, based on the route scheduled to be traveled by the mobile object 30, the position information of the mobile object 30, and the position information of the vehicle 60 and the mobile communication terminal 20, the vehicle 60a which is predicted to enter the communication available area 80 from an outside of a communication available area 80 of the direct communication of the mobile object 30 within a predetermined time, the vehicle 60b and the mobile communication terminal 20 which are predicted to be present inside the communication available area 80 of the mobile object 30 for a predetermined time or longer, and the vehicle 60c which is predicted to exit from the inside of the communication available area 80 of the mobile object 30 to the outside of the communication available area 80 within a predetermined time.

Upon predicting that the vehicle 60a enters the communication available area 80 from the outside of the communication available area 80 of the direct communication of the mobile object 30 within the predetermined time, the server 40 transmits traveling history information of the vehicle 60a to the mobile object 30, and transmits, to the vehicle 60, an instruction that communication with the mobile object 30 should be started by the direct communication. Upon predicting that the vehicle 60c exits from the inside of the communication available area 80 of the direct communication of the mobile object 30 to the outside of the communication available area 80 within the predetermined time, the server 40 instructs the mobile object 30 to transmit traveling history information of the vehicle 60c to the server 40, and transmits, to the vehicle 60c, an instruction to stop the direct communication with the mobile object 30 and to restart communication with the server 40 by the mobile object communication.

In this manner, the vehicle 60d which has been determined as not entering the communication available area 80 of the mobile object 30 exchanges the information related to the traffic risk by the mobile object communication with the server 40, and the vehicle 60b and the mobile communication terminal 20 which are predicted to be present inside the communication available area 80 of the mobile object 30 for the predetermined time or longer exchange the information related to the traffic risk by the direct communication with the mobile object 30.

The mobile object 30 has an object detecting function by a camera function and/or a LIDAR. The mobile object 30 recognizes an object 90 which is an obstacle detected by the object detecting function, and detects a position of the recognized object 90. The object 90 may be an electric pole, a roadside tree, or the like, for example. The object 90 may be an object that may become an obstruction of movements of traffic participants. The object 90 may be an object that causes generation of a dead angle for traffic participants. The mobile object 30 judges a traffic risk based on the position information of the vehicle 60, the position information of the mobile communication terminal 20, and the position of the object 90. In this manner, the mobile object 30 can provide the information related to the traffic risk with consideration given to a pedestrian avoiding the object 90 and coming out to a vehicular road. The mobile object 30 may further transmit the position of the detected object 90 to the server 40. In this manner, the server 40 can provide assistance information with consideration given to the position of the object 90 outside the communication available area 80 of the mobile object 30.

According to the system 10, the server 40 can provide, to the mobile object 30, information related to the vehicle 60 entering a communication area of the mobile object 30. Therefore, the mobile object 30 can receive information required for determination on a traffic risk or the like of the vehicle 60 by the mobile object 30 from the server 40, and take over a processing of determining the traffic risk or the like.

FIG. 2 illustrates a functional configuration of the server 40. The server 40 includes a processing section 200, a storage section 280, and a communication section 270. The processing section 200 includes a predicting section 230 and a determining section 240. The communication section 270 includes a first transmission section 210, a first reception section 212, a second transmission section 220, and a second reception section 222.

The server 40 may be constructed by including a computer. The processing section 200 may be implemented by a processor such as a CPU that performs calculation processing. The storage section 280 may include a nonvolatile storage medium such as a flash memory or a volatile storage medium such as a random access memory. The mobile communication section 270 may be implemented by a communication processor. The server 40 may perform various types of processing as a result of the processing section 200 operating according to a program stored on a nonvolatile storage medium included in the storage section 280.

The first reception section 212 receives position information of traffic participants from the traffic participants. In the present embodiment, the traffic participants are the vehicle 60 and the mobile communication terminal 20. The first reception section 212 receives the position information from the traffic participants by the mobile object communication. The first transmission section 210 transmits the assistance information related to movements of the traffic participants to the traffic participants through the base station of the mobile communication, based on the position information of the traffic participants. The first transmission section 210 transmits the assistance information by the mobile object communication.

The determining section 240 may determine whether there is a traffic risk for the vehicle 60 based on the position information received from the vehicle 60 and the position information received from the mobile communication terminal 20. For example, the determining section 240 may determine that there is a traffic risk when the mobile communication terminal 20 is moving toward a future position in an advancing direction of the vehicle 60, and the vehicle 60 has a possibility of reaching the future position of the mobile communication terminal 20 within a predetermined time. When the determining section 240 determines that there is a traffic risk, the first transmission section 210 may transmit information representing the presence of the traffic risk to the traffic participants as the assistance information. The first transmission section 210 may transmit warning information for the traffic participants as the assistance information.

The predicting section 230 predicts, based on the position information of the traffic participants, a traffic participant entering the communication available area 80 of the mobile object 30 having a function of communicating with the traffic participants. The second transmission section 220 transmits, to the mobile object 30, information related to the traffic participant predicted to enter the communication available area 80 by the predicting section 230. The second transmission section 220 transmits the information related to the traffic participant to the mobile object 30 by the mobile object communication. As an example, the second transmission section 220 transmits, to the mobile object 30, movement history information of the traffic participant predicted to enter the communication available area 80 by the predicting section 230.

The predicting section 230 predicts the traffic participant entering the communication available area 80 based on advancing schedule information of the mobile object 30 and the position information of the mobile object 30, and positions and advancing directions specified from the position information of the traffic participants.

The predicting section 230 may predict a traffic participant which is present inside the communication available area 80 for a predetermined time or longer. The predicting section 230 may predict the traffic participant which is present inside the communication available area 80 for the predetermined time or longer based on a position and an advancing speed of the vehicle 60 and a position and an advancing speed of the mobile object 30, and the advancing schedule information of the mobile object 30.

The second reception section 222 receives, from the mobile object 30, identification information of a traffic participant predicted to exit from the inside of the communication available area 80. The second reception section 222 receives the identification information of the traffic participant from the mobile object 30 by the mobile object communication. The second reception section 222 further receives, from the mobile object 30, history information of a position inside the communication available area 80 of the traffic participant predicted to exit from the inside of the communication available area 80.

The first transmission section 210 further transmits, to the traffic participant predicted to enter the communication available area 80 by the predicting section 230, an instruction to switch a destination of the position information to the mobile object 30. The first transmission section 210 may further transmit, to the traffic participant predicted to exit from the inside of the communication available area 80, an instruction to switch the destination of the position information to the first reception section 212.

Figure 3:
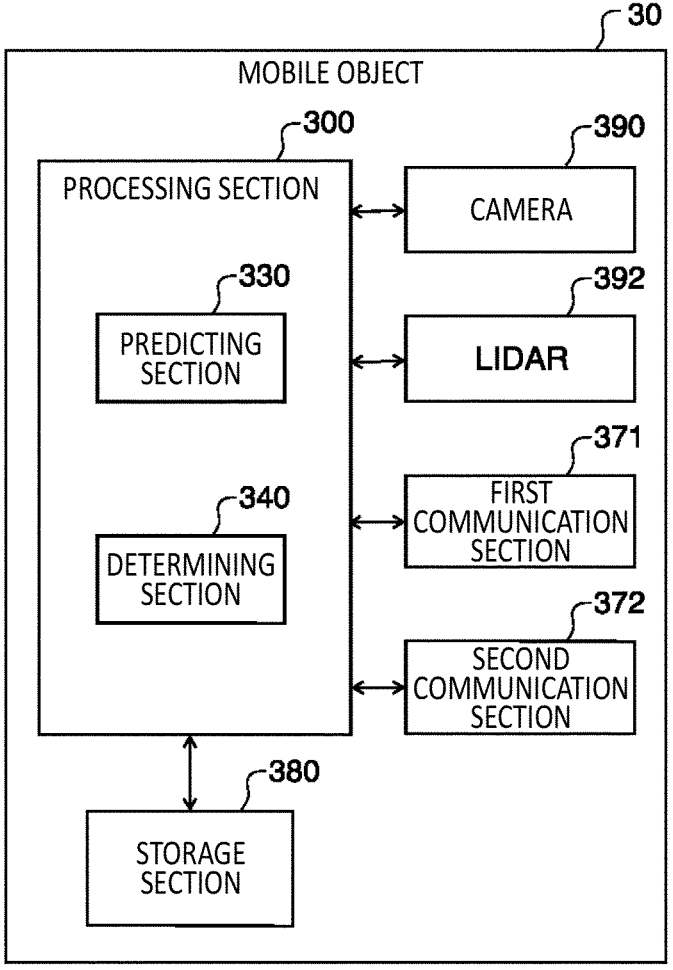
FIG. 3 illustrates a functional configuration of a mobile object 30.

FIG. 3 illustrates a functional configuration of the mobile object 30. The mobile object 30 includes a processing section 300, a storage section 380, a first communication section 371, a second communication section 372, a camera 390, and a LIDAR 392. The processing section 300 includes a predicting section 330 and a determining section 340.

The mobile object 30 may be constructed by including a computer. The processing section 300 may be implemented by a processor such as a CPU that performs calculation processing. The storage section 380 may include a nonvolatile storage medium such as a flash memory or a volatile storage medium such as a random access memory. The first communication section 371 and the second communication section 372 may be implemented by a communication processor. The mobile object 30 may perform various types of processing as a result of the processing section 300 operating according to a program stored on a nonvolatile storage medium included in the storage section 380.

The camera 390 captures an image of an exterior of the mobile object 30, and outputs image information. The camera 390 may output information representing a distance to a subject by a phase difference detection method. The LIDAR 392 is an example of an optical ranging apparatus which detects a distance to an object by using a light. The light to be used by the LIDAR 392 may be a laser light, an infrared light, or the like.

The first communication section 371 carries out the mobile object communication with the server 40. The second communication section 372 carries out the direct communication. A communication method of the direct communication is C-V2X, Wi-Fi (registered trademark), or the like, for example.

The first communication section 371 transmits, to the server 40, current position information of the mobile object 30, and information recognized by the camera 390 and the LIDAR 392.

The first communication section 371 receives, from the server 40 by the mobile object communication, movement history information of a traffic participant predicted to enter the communication available area 80 in the predicting section 230 of the server 40, and identification information of the traffic participant. The second communication section 372 receives position information of traffic participants from the traffic participants inside the communication available area 80 by the direct communication. The determining section 340 determines whether there is a traffic risk for the traffic participant based on the movement history information of the traffic participant received from the server 40 and the position information received with the second communication section 372 from the traffic participants. For example, the determining section 340 may determine that there is a traffic risk when the mobile communication terminal 20 is moving toward a future position in an advancing direction of the vehicle 60, and the vehicle 60 has a possibility of reaching the future position of the mobile communication terminal 20 within a predetermined time. When the determining section 340 determines that there is a traffic risk, the second communication section 372 may transmit information representing the presence of the traffic risk to the traffic participants as the assistance information. The second communication section 372 may transmit warning information for the traffic participants as the assistance information.

The predicting section 330 predicts a traffic participant exiting to the outside of the communication available area 80 of the mobile object 30, based on the position information of the traffic participants. The predicting section 330 predicts the traffic participant exiting from the inside of the communication available area 80 to the outside of the communication available area 80 based on the advancing schedule information of the mobile object 30 and the position information of the mobile object 30, and positions and advancing directions specified from the position information of the traffic participants. The predicting section 330 may predict a traffic participant exiting from the inside of the communication available area 80 to the outside of the communication available area 80 within a predetermined time.

When a traffic participant exiting from the inside of the communication available area 80 to the outside of the communication available area 80 is predicted by the predicting section 330, the second communication section 372 transmits, to the traffic participant predicted to exit to the outside of the communication available area 80, an instruction to switch the destination of the position information to the server 40. When a traffic participant exiting from the inside of the communication available area 80 to the outside of the communication available area 80 is predicted by the predicting section 330, the first communication section 371 transmits, to the server 40, identification information of the traffic participant and history information of a position of the traffic participant inside the communication available area 80. When a traffic participant exiting from the inside of the communication available area 80 to the outside of the communication available area 80 is predicted, the first communication section 371 may inform the server 40 to transmit, to the traffic participant through the server 40, an instruction to switch the destination of the position information of the traffic participant to the server 40.

Figure 4:
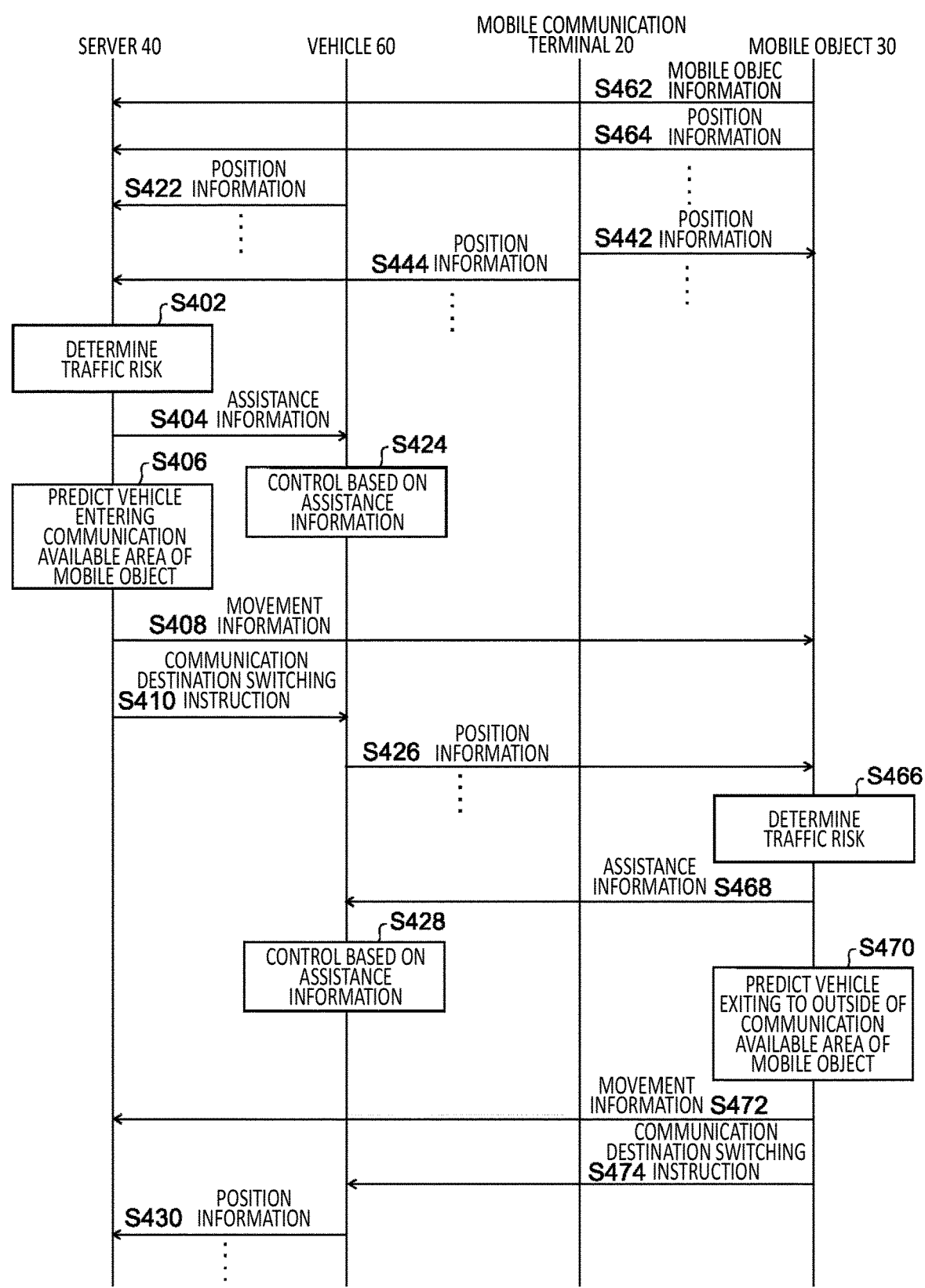
FIG. 4 illustrates a flow of processings related to a method performed by the server 40, a vehicle 60, a mobile communication terminal 20, and the mobile object 30.

FIG. 4 illustrates a flow of processings related to a method performed by the server 40, the vehicle 60, the mobile communication terminal 20, and the mobile object 30. Specifically, FIG. 4 illustrates a flow of processings when the server 40 and the mobile object 30 transmit assistance information to the vehicle 60 under a situation where the vehicle 60 that is positioned outside the communication available area 80 enters the communication available area 80 and then exits to the outside of the communication available area 80.

In S462, the first communication section 371 of the mobile object 30 transmits mobile object information to the server 40 by the mobile object communication. The mobile object information includes, for example, information representing traveling schedule information of the mobile object 30 and an extent of the communication available area 80 of the mobile object 30. The traveling schedule information is information on a path to be traveled by the mobile object 30, for example. The mobile object 30 may transmit the mobile object information to the server 40 when starting traveling. The mobile object 30 may transmit the mobile object information to the server 40 when the path scheduled to be traveled has been changed. The mobile object information of the mobile object 30 may be registered on the server 40 in advance. When the mobile object 30 is a public transportation such as a bus, information representing an operation path of the mobile object 30 and an extent of the communication available area 80 of the mobile object 30 may be registered on the server 40 in advance.

In S464, the first communication section 371 of the mobile object 30 starts a periodic transmission of position information of the mobile object 30 and position information of the object 90 recognized in the mobile object 30. In S464, the mobile object 30 periodically calculates latitude and longitude information of a current position of the mobile object 30 based on a GNSS signal received from a positioning satellite forming a GNSS, and periodically transmits the calculated latitude and longitude information from the first communication section 371 to the server 40 by the mobile object communication.

In S422, the vehicle 60 that is positioned outside the communication available area 80 of the mobile object 30 transmits the position information to the server 40 by the mobile object communication. The vehicle 60 periodically calculates latitude and longitude information of a current position of the vehicle 60 based on a signal received from a positioning satellite forming the GNSS, and periodically transmits the calculated latitude and longitude information to the server 40. The first reception section 212 of the server 40 receives the position information transmitted from the vehicle 60 by the mobile object communication.

Among the mobile communication terminals 20, the mobile communication terminal 20 that is positioned inside the communication available area 80 of the mobile object 30 transmits position information to the mobile object 30 (S442), and the mobile communication terminal 20 that is positioned outside the communication available area 80 of the mobile object 30 transmits position information to the server 40 (S444). The mobile communication terminal 20 periodically calculates latitude and longitude information of a current position of the mobile communication terminal 20 based on a signal received from a positioning satellite forming the GNSS, and periodically transmits the calculated latitude and longitude information to the server 40 or the mobile object 30.

In S402, the determining section 240 of the server 40 determines whether there is a traffic risk for the vehicle 60 based on the position information received from the vehicle 60 and the position information received from the mobile communication terminal 20. For example, when the vehicle 60 has a possibility of reaching a future position of the mobile communication terminal 20 within a predetermined time, the determining section 240 determines that there is a traffic risk. When the vehicle 60 is determined as having a traffic risk, in S404, the first transmission section 210 of the server 40 transmits assistance information related to the traffic risk to the vehicle 60 by the mobile object communication.

For example, the determining section 240 determines whether the vehicle 60 has the possibility of reaching the future position of the mobile communication terminal 20 within the predetermined time based on a history of the position information of the mobile communication terminal 20 and a history of the position information of the vehicle 60. When the vehicle 60 is determined as having the possibility of reaching the future position of the mobile communication terminal 20 within the predetermined time, the first transmission section 210 transmits warning information to the vehicle 60.

In S424, the vehicle 60 performs control based on the assistance information received from the server 40. For example, the vehicle 60 outputs a warning when receiving the warning information from the server 40. As an example, the vehicle 60 may output a warning sound in response to receiving the warning information. In this manner, a passenger of the vehicle 60 can be informed of the presence of the traffic risk.

In S406, the predicting section 230 of the server 40 predicts the vehicle 60 entering the communication available area 80 from the outside of the communication available area 80 of the mobile object 30. For example, the predicting section 230 predicts the vehicle 60 entering the communication available area 80 of the mobile object 30 within a predetermined time based on the information representing the path scheduled to be traveled by the mobile object 30 and the extent of the communication available area 80 included in the mobile object information, the current position of the mobile object 30, the current position of the vehicle 60, and an advancing speed of the vehicle 60 calculated from a history of the current position of the vehicle 60.

When the vehicle 60 is predicted to enter the communication available area 80 of the mobile object 30 by the predicting section 230, in S408, the second transmission section 220 transmits mobile information of the vehicle 60 to the mobile object 30 by the mobile object communication. The mobile information may include identification information and movement history information of the vehicle 60 entering the communication available area 80. The movement history information may be a history of the position information of the vehicle 60 in a predetermined period. The predetermined period may be a most recent predetermined period, for example. The predetermined period may be a period such as most recent one minute or most recent five minutes. The predetermined period may be decided in accordance with a type of service to be provided for the vehicle 60. When providing service that requires information immediately before entering of the vehicle 60 into the communication available area 80 in determining a traffic risk of the vehicle 60, the predetermined period may be a period about most recent one minute.

In S410, the first transmission section 210 transmits, to the vehicle 60 by the mobile object communication, a communication destination switching instruction that a communication destination related to the position information should be switched to the mobile object 30. Upon receiving the communication destination switching instruction from the server 40, in S426, the vehicle 60 starts a periodic transmission of the position information of the vehicle 60 to the mobile object 30. In S426, the vehicle 60 transmits the position information to the mobile object 30 by the direct communication.

In S466, the determining section 340 of the mobile object 30 determines whether there is a traffic risk for the vehicle 60 based on the history of the position information of the vehicle 60 included in the mobile information received in S408, position information received from the vehicle 60 inside the communication available area 80, and position information received from the mobile communication terminal 20 inside the communication available area 80. When the vehicle 60 is determined as having a traffic risk, in S468, the second communication section 372 transmits assistance information related to the traffic risk to the vehicle 60 by the direct communication.

For example, in S466, the determining section 340 determines whether there is a possibility of the vehicle 60 reaching a future position of the mobile communication terminal 20 within a predetermined time. When the vehicle 60 is determined as having the possibility of reaching the future position of the mobile communication terminal 20 within the predetermined time, the second communication section 372 transmits warning information to the vehicle 60 by the direct communication.

In S428, the vehicle 60 performs control based on the assistance information received from the mobile object 30 by the direct communication. For example, the vehicle 60 outputs a warning when receiving the warning information from the mobile object 30. As an example, the vehicle 60 may output a warning sound in response to receiving the warning information.

In S470, the predicting section 330 of the mobile object 30 predicts the vehicle 60 exiting from the inside of the communication available area 80 of the mobile object 30 to the outside of the communication available area 80. For example, the predicting section 330 predicts the vehicle 60 exiting to the outside of the communication available area 80 of the mobile object 30 within a predetermined time based on the information representing the path scheduled to be traveled by the mobile object 30 and the extent of the communication available area 80, the current position of the mobile object 30, the current position of the vehicle 60, and the advancing speed of the vehicle 60 calculated from the history of the current position of the vehicle 60.

When the vehicle 60 is predicted to exit to the outside of the communication available area 80 of the mobile object 30 by the predicting section 330, in S472, the first communication section 371 transmits mobile information of the vehicle 60 to the server 40 by the mobile object communication. The mobile information may include identification information and movement history information of the vehicle 60 exiting to the outside of the communication available area 80. The movement history information may be a history of the position information of the vehicle 60 in a predetermined period. As has been described in connection to S408, the predetermined period may be a most recent predetermined period, for example. For example, the predetermined period may be a period such as most recent one minute or most recent five minutes.

In S474, the second communication section 372 transmits, to the vehicle 60 by the direct communication, a communication destination switching instruction that a communication destination related to the position information should be switched to the server 40. Upon receiving the communication destination switching instruction from the mobile object 30, in S430, the vehicle 60 starts a periodic transmission of the position information of the vehicle 60 to the mobile object 30. In S430, the vehicle 60 transmits the position information to the server 40 by the mobile object communication.

As has been described above, with the system 10 according to the present embodiment, the server 40 gives assistance to traffic participants positioned outside the communication available area 80 of the mobile object 30, and the mobile object 30 gives assistance to traffic participants inside the communication available area 80 of the mobile object 30. In this manner, a processing load of the server 40 can be distributed. When a traffic participant enters the communication available area 80 of the mobile object 30, the server 40 transmits history information of the traffic participant in the past to the mobile object 30, and thus the mobile object 30 can continue assistance to the traffic participant by using the history information received from the server 40. Therefore, the mobile object 30 can seamlessly take over the processing of performing the assistance to the traffic participant from the server 40.

When being positioned inside the communication available area 80 of the mobile object 30, the traffic participant exchanges information related to traffic assistance not by the base station communication with the server 40 but by the direct communication with the mobile object 30. In this manner, as compared to when exchanging information by both the base station communication and the direct communication, electric power required for the communication can be reduced.

The mobile object 30 recognizes an object that becomes a cause of running out of a pedestrian such as a terminating position of a sidewalk or an obstacle such as an object on a sidewalk, and transmits position information of the recognized object to the server 40. In this manner, the server 40 can assist traffic participants by using the position information of the object received from the mobile object 30. In this manner, traffic participants can be assisted with tracking of a change in a situation of a sidewalk such as when an object that becomes an obstruction for pedestrians is newly set on the sidewalk. In this manner, according to the system 10, traffic participants can be assisted with higher accuracy by using position information of an obstacle or the like that cannot be judged from map information.

Figure 5:
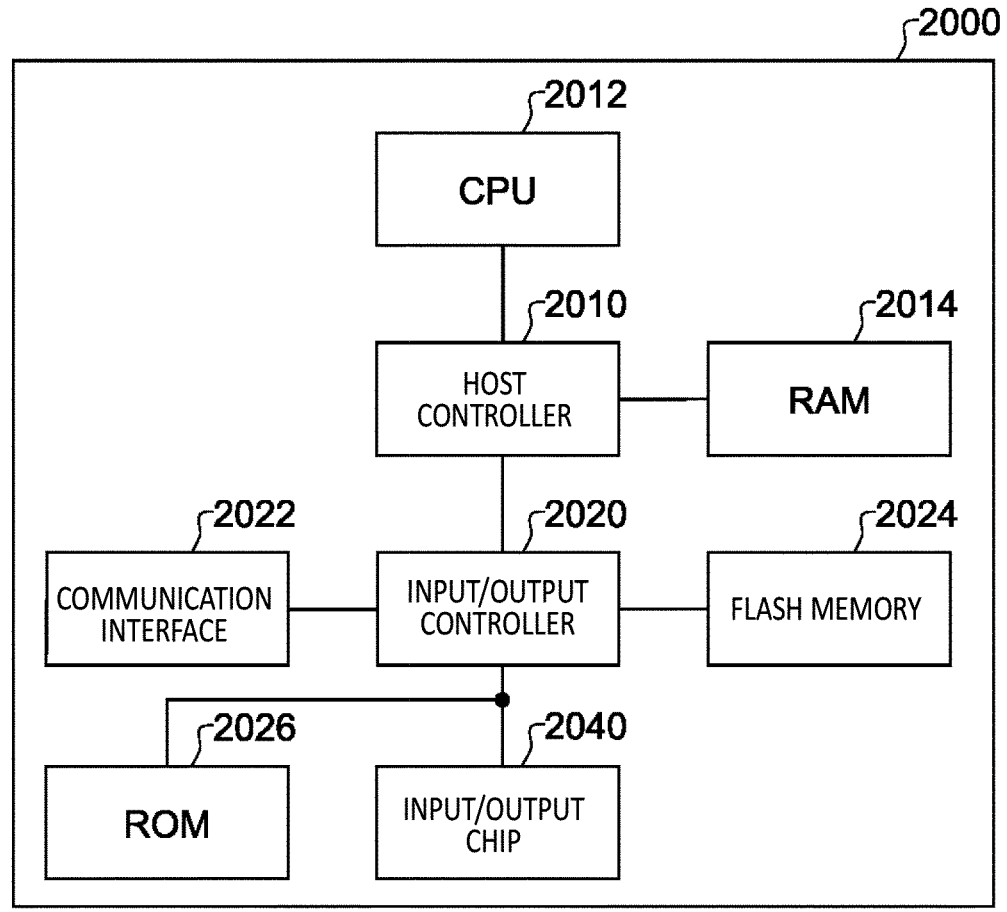
FIG. 5 illustrates an example of a computer 2000.

FIG. 5 illustrates an example of a computer 2000 in which a plurality of embodiments of the present invention can be embodied entirely or partially. A program installed in the computer 2000 can cause the computer 2000 to function as a system such as the server 40 according to an embodiment or each section of the system, or an apparatus such as the mobile object 30 or each section of the apparatus, execute operations associated with the system, each section of the system, the apparatus, or each section of the apparatus, and/or execute a process according to an embodiment or a stage of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer readable storage medium such as a CD-ROM, a DVD-ROM, or a memory card. The RAM 2014, the ROM 2026, or the flash memory 2024 is an example of the computer readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources described above. An apparatus or a method may be actualized by executing operations or processing of information depending on a use of the computer 2000.

For example, when communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval/replacement, or the like described in the present specification and specified by instruction sequences of the programs, and write back a result into the RAM 2014. In addition, the CPU 2012 may retrieve information in a file, a database, or the like in the recording medium. For example, when multiple entries, each having an attribute value of a first attribute associated with an attribute value of a second attribute, is stored in the recording medium, the CPU 2012 may retrieve an entry having a designated attribute value of the first attribute that matches a condition from the multiple entries, and read the attribute value of the second attribute stored in the entry, thereby obtaining the attribute value of the second attribute associated with the first attribute that satisfies a predetermined condition.

The programs or software modules explained above may be stored in the computer readable storage medium on the computer 2000 or in the vicinity of the computer 2000. A recording medium such as a hard disk or a RAM provided in a server system connected to a dedicated communication network or the Internet can be used as the computer readable storage medium. A program stored in the computer readable storage medium may be provided to the computer 2000 via a network.

A program that is installed into the computer 2000 and makes the computer 2000 function as the server 40 may work on the CPU 2012 and the like to make the computer 2000 function as respective sections of the server 40, respectively. The information processing written in these programs is read by the computer 2000 to function as each section of the server 40 which is a specific means in which software and the above-described various hardware resources cooperate. Then, with these specific means, by achieving computing or processing of information according to an intended use of the computer 2000 in the present embodiment, the specific server 40 is constructed according to the intended use.

Various embodiments have been explained with reference to the block diagrams and the like. In the block diagrams, each block may represent (1) a stage of a process in which an operation is executed, or (2) each section of the apparatus having a role in executing the operation. A specific stage and each section may be implemented by a dedicated circuit, a programmable circuit supplied with computer-readable instructions stored on a computer readable storage medium, and/or a processor supplied with computer-readable instructions stored on a computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer readable storage medium may include any tangible device capable of storing instructions to be executed by an appropriate device. Thereby, the computer readable storage medium having instructions stored therein forms at least a part of a product including instructions which can be executed to provide means for executing processing procedures or operations specified in the block diagrams. An example of the computer readable storage medium may include an electronic storage medium, a magnetic storage medium, an optical storage medium, an electromagnetic storage medium, or a semiconductor storage medium. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or other programmable data processing device, or to programmable circuit, locally or via a local area network (LAN), wide area network (WAN) such as the Internet, and a computer-readable instruction may be executed to provide means for executing operations specified in the explained processing procedures or block diagrams. Examples of the processor include a computer processor, a processing unit, a microprocessor, a digital signal processor, a controller, a microcontroller, and the like.

While the present invention has been described by way of the embodiments, the technical scope of the present invention is not limited to the scope described in the above-described embodiment. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages etc. of each process performed by a device, system, program, and method shown in the claims, specification, or drawings can be executed in any order as long as the order is not indicated by "before", "prior to", or the like and as long as the output from a previous process is not used in a later process. Even if the operation flow is described using phrases such as "first" or "next" in the claims, specification, or drawings, it does not necessarily mean that the process must be performed in this order.

EXPLANATION OF REFERENCES

10: system;
20: mobile communication terminal;
30: mobile object;
40: server;
50: base station;
60: vehicle;
70: person;
80: communication available area;
90: object;
200: processing section;
210: first transmission section;
212: first reception section;
220: second transmission section;
222: second reception section;
230: predicting section;
240: determining section;
270: communication section;
280: storage section;
300: processing section;
330: predicting section;
340: determining section;
371: first communication section;
372: second communication section;

380: storage section;
390: camera;
392: LI DAR;
2000: computer;
2010: host controller;
2012: CPU;
2014: RAM;
2020: input/output controller;
2022: communication interface;
2024: flash memory;
2026: ROM;
2040: Input/output chip.

What is claimed is:

1. A system for providing information to a plural pieces of equipment, each of which is movable, external to the system, and communicable with the system, the system comprising:
a first reception section which receives position information of each of the plural pieces of equipment from each of the plural pieces of equipment;
a first transmission section which transmits, based on the position information of each of the plural pieces of equipment, assistance information related to a movement of each of the plural pieces of equipment to each of the plural pieces of equipment through a base station of a mobile communication;
a predicting section which predicts, among the plural pieces of equipment, based on the position information of each of the plural pieces of equipment, equipment entering a communication available area of a mobile object, in which the mobile object is capable of performing a direct communication with the equipment, the mobile object being external to the system and the plural pieces of equipment; and
a second transmission section which transmits, to the mobile object, information related to the equipment predicted to enter the communication available area by the predicting section,
wherein the first transmission section further transmits, to the equipment predicted to enter the communication available area, an instruction indicating that a communication destination to which the equipment sends the position information should be switched from the first reception section to the mobile object and causes the equipment to start periodically transmitting the position information to the mobile object.

2. The system according to claim 1, wherein the predicting section predicts the equipment entering the communication available area based on advancing schedule information of the mobile object and position information of the mobile object, and a position and an advancing direction specified from the position information of the equipment.

3. The system according to claim 2, wherein the predicting section predicts the equipment which is present inside the communication available area for a predetermined time or longer.

4. The system according to claim 2, wherein the second transmission section transmits, to the mobile object, movement history information of the equipment predicted to enter the communication available area by the predicting section.

5. The system according to claim 2, further comprising a second reception section which receives, from the mobile object, identification information of the equipment predicted to exit from an inside of the communication available area.

6. The system according to claim 5, wherein the second reception section further receives, from the mobile object, history information of a position inside the communication available area of the equipment predicted to exit from the inside of the communication available area.

7. The system according to claim 2, wherein the first transmission section further transmits, to the equipment predicted to exit from an inside of the communication available area, an instruction to switch the communication destination of the position information from the mobile object to the first reception section.

8. The system according to claim 1, wherein the predicting section predicts the equipment which is present inside the communication available area for a predetermined time or longer.

9. The system according to claim 8, further comprising a second reception section which receives, from the mobile object, identification information of the equipment predicted to exit from an inside of the communication available area.

10. The system according to claim 8, wherein the first transmission section transmits the instruction to the equipment predicted to enter the communication available area when the equipment is further predicted to be present inside the communication available area for a predetermined time or longer by the predicting section.

11. The system according to claim 1, wherein the second transmission section transmits, to the mobile object, movement history information of the equipment predicted to enter the communication available area by the predicting section.

12. The system according to claim 1, further comprising a second reception section which receives, from the mobile object, identification information of the equipment predicted to exit from an inside of the communication available area.

13. The system according to claim 12, wherein the second reception section further receives, from the mobile object, history information of a position inside the communication available area of the equipment predicted to exit from the inside of the communication available area.

14. The system according to claim 12, wherein the first transmission section further transmits, to the equipment predicted to exit from the inside of the communication available area, an instruction to switch the communication destination of the position information from the mobile object to the first reception section.

15. The system according to claim 1, wherein the first transmission section further transmits, to the equipment predicted to exit from an inside of the communication available area, an instruction to switch the communication destination of the position information from the mobile object to the first reception section.

16. The system according to claim 1, further comprising the mobile object.

17. A method for providing information to a plural pieces of equipment, each of which is movable, the method being performed by a system and comprising:

receiving position information of each of the plural pieces of equipment from each of the plural pieces of equipment;

transmitting, based on the position information of each of the plural pieces of equipment, assistance information related to a movement of each of the plural pieces of equipment to each of the plural pieces of equipment through a base station of a mobile communication;

predicting, among the plural pieces of equipment, based on the position information of each of the plural pieces of equipment, equipment entering a communication available area of a mobile object, in which the mobile object is capable of performing a direct communication with the equipment;

transmitting, to the mobile object, information related to the equipment predicted to enter the communication available area in the predicting; and transmitting, to the equipment predicted to enter the communication available area, an instruction indicating that a communication destination to which the equipment sends the position information should be switched from the system to the mobile object and causing the equipment to start periodically transmitting the position information to the mobile object, wherein the system, the plural pieces of equipment, and the mobile object are external to each other.

18. A non-transitory computer readable storage medium having stored therein a program for a system for providing information to a plural pieces of equipment, each of which is movable, external to the system, and communicable with the system, the program causing a computer to perform:

receiving position information of each of the plural pieces of equipment from each of the plural pieces of equipment;

transmitting, based on the position information of each of the plural pieces of equipment, assistance information related to a movement of each of the plural pieces of equipment to each of the plural pieces of equipment through a base station of a mobile communication;

predicting, among the plural pieces of equipment, based on the position information of each of the plural pieces of equipment, equipment entering a communication available area of a mobile object, in which the mobile object is capable of performing a direct communication with the equipment, the mobile object being external to the system and the plural pieces of equipment;

transmitting, to the mobile object, information related to the equipment predicted to enter the communication available area in the predicting; and transmitting, to the equipment predicted to enter the communication available area, an instruction indicating that a communication destination to which the equipment sends the position information should be switched from the system to the mobile object and causing the equipment to start periodically transmitting the position information to the mobile object.

* * * * *